United States Patent
Hou et al.

(10) Patent No.: US 9,787,203 B2
(45) Date of Patent: Oct. 10, 2017

(54) POWER SOURCE MANAGEMENT METHOD AND POWER SOURCE

(71) Applicant: Huawei Technologies Co., LTD, Shenzhen (CN)

(72) Inventors: Zhaozheng Hou, Shenzhen (CN); Xiaodong Fan, Shenzhen (CN); Jiebin Cheng, Shenzhen (CN); Zhihua Liu, Nuremberg (DE); Xuezhen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/383,614

(22) Filed: Dec. 19, 2016

(65) Prior Publication Data

US 2017/0099005 A1    Apr. 6, 2017

Related U.S. Application Data

(63) Continuation of application No. PCT/CN2015/070137, filed on Jan. 6, 2015.

(30) Foreign Application Priority Data

Jun. 20, 2014   (CN) .......................... 2014 1 0281443

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 2001/0009* (2013.01)

(58) Field of Classification Search
CPC . H02M 2001/0003; H02M 2001/0022; H02M 3/335; H02M 3/3353; H02M 3/33592; H02M 3/33569
See application file for complete search history.

(56) References Cited

U.S. PATENT DOCUMENTS

| 7,558,093 B1 | 7/2009 | Zheng |
| 9,337,741 B2 * | 5/2016 | Fan ................... H02M 3/33523 |

(Continued)

FOREIGN PATENT DOCUMENTS

| CN | 101034848 A | 9/2007 |
| CN | 101247088 A | 8/2008 |

(Continued)

OTHER PUBLICATIONS

International Search Report issued in International Application No. PCT/CN2015/070137, dated Apr. 13, 2015, 4 pages.

(Continued)

*Primary Examiner* — Gary L Laxton
(74) *Attorney, Agent, or Firm* — Fish & Richardson P.C.

(57) ABSTRACT

A power source management method and a power source are provided. The method includes: comparing a feedforward control signal with a feedback control signal by using a logic control circuit, outputting the signals after the comparison, and performing matching, to obtain control signals of switching transistors of a full-bridge topology circuit; and adjusting the control signals of the switching transistors of the full-bridge topology circuit by using the logic control circuit, so that operating duty cycles of two bridge arms on a primary side match, are symmetric within one switch period of the logic control circuit, or match for a long time, to prevent transformer biasing. The power source management method and the power source can achieve good feedforward performance, suppress input disturbance, and additionally prevent transformer biasing, which ensures that the power source works normally.

14 Claims, 5 Drawing Sheets

(56) References Cited

U.S. PATENT DOCUMENTS

| | | | |
|---|---|---|---|
| 2008/0198631 A1 | 8/2008 | Zeng et al. | |
| 2011/0026275 A1 | 2/2011 | Huang et al. | |
| 2013/0033904 A1* | 2/2013 | Ye | H02M 3/33576 363/17 |
| 2013/0155726 A1* | 6/2013 | Xu | H02M 3/33576 363/17 |
| 2014/0313784 A1* | 10/2014 | Strzalkowski | H02M 3/33584 363/17 |

FOREIGN PATENT DOCUMENTS

| | | |
|---|---|---|
| CN | 101350557 A | 5/2010 |
| CN | 101771360 A | 7/2010 |
| CN | 103066854 A | 4/2013 |
| CN | 103856055 A | 6/2014 |
| CN | 104079176 A | 10/2014 |
| JP | 2003037973 A | 2/2003 |
| JP | 2003037973 A | 7/2003 |
| JP | 2004159473 | 6/2004 |
| WO | 2013113354 A1 | 8/2013 |
| WO | 2014077281 A1 | 5/2014 |

OTHER PUBLICATIONS

European Search Report issued in EP Application No. 15810506.4 dated Jun. 2, 2017, 7 pages.
Office Action issued in Chinese Application No. 201410281443.2 dated Jan. 15, 2016, 4 pages.
Search Report issued in Chinese Application No. 2014102814432 dated Jan. 5, 2016, 2 pages.
International Search Report issued in International Application No. PCT/CN2015/070137 dated Mar. 27, 2015, 5 pages.

* cited by examiner

POWER SOURCE MANAGEMENT METHOD AND POWER SOURCE

CROSS-REFERENCE TO RELATED APPLICATIONS

This application is a continuation of International Application No. PCT/CN2015/070137, filed on Jan. 6, 2015, which claims priority to Chinese Patent Application No. 201410281443.2, filed on Jun. 20, 2014. The disclosures of the aforementioned applications are hereby incorporated by reference in their entireties.

TECHNICAL FIELD

The present application relates to the field of electronic technologies, and in particular, to a power source management method and a power source.

BACKGROUND

A digital power source controller may be used for a power source that outputs a constant voltage, and generally encounters input disturbance and output disturbance. To eliminate the input disturbance, a feedforward technology is generally used. There are multiple manners for an implementation method, such as pure digital feedforward; or control is performed in peak current mode. However, the peak current mode is antilogical for dynamic load adjustment (that is, when a load current increases, a duty cycle decreases instead), which affects the feedforward sensitivity to satisfy a dynamic requirement, and reduces a capability of suppressing the input disturbance. Therefore it is difficult to strike a balance between output disturbance suppression and input disturbance suppression. In an application of an isolated power source, for ease of communication, output current detection, and output voltage feedback, a controller is generally placed on a secondary side. Therefore, in various feedforward manners, an input voltage detection problem occurs, and in particular, it is a difficult choice to use setting of a digital feedforward sampling point.

SUMMARY

To resolve the technical problems, embodiments of the present application provide a power source management method and a power source, which can achieve good feedforward performance, suppress input disturbance, and additionally eliminate biasing in the power source, and protect a transformer, which ensures that the power source works normally.

A first aspect of the embodiments of the present application provides a power source management method, used to suppress input disturbance of a power source and prevent a power source transformer biasing, where the power source includes a full-bridge topology circuit and a control circuit, where the control circuit includes a logic control circuit, a feedforward circuit, and a feedback circuit, a secondary side of the full-bridge topology circuit uses a full-wave rectifier circuit, and the feedforward circuit is configured to sample a center tap voltage of the full-wave rectifier circuit, charge a capacitor in the feedforward circuit by using the center tap voltage, and control, by using the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, where different slopes of the sawtooth wave correspond to different input voltages of the power source; the feedforward circuit uses the sawtooth wave as a feedforward control signal.

The power source management method includes: modulating, by using the sawtooth signal, a feedback control signal of the feedback circuit by using the logic control circuit, and performing matching, to obtain feedforward performance and additionally prevent biasing, which is specifically:

comparing the feedforward control signal with the feedback control signal by using the logic control circuit, outputting the signals after the comparison, and performing matching, to obtain control signals of switching transistors of the full-bridge topology circuit; and adjusting the control signals of the switching transistors of the full-bridge topology circuit by using the logic control circuit, so that operating duty cycles of two bridge arms on a primary side match, are symmetric within one switch period of the logic control circuit, or match for a long time, to prevent the transformer biasing.

With reference to the first aspect, in a first possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit.

So that operating duty cycles of two bridge arms on a primary side match, are symmetric within one switch period of the logic control circuit, or match for a long time includes:

adjusting the control signals of the switching transistors of the two bridge arms within the one switch period of the logic control circuit, by using the logic control circuit, and based on a center tap voltage sampled within the first half period by the feedforward circuit, so that an operating duty cycle of the second bridge arm within the second half period is the same as an operating duty cycle of the first bridge arm within the first half period; or if an operating duty cycle of the second bridge arm within the second half period is greater than an operating duty cycle of the first bridge arm within the first half period, adjusting the control signals of the switching transistors of the two bridge arms by using the logic control circuit and based on a center tap voltage sampled in the first half period by the feedforward circuit, so that the operating duty cycle of the second bridge arm within the second half period is the same as the operating duty cycle of the first bridge arm within the first half period; or if an operating duty cycle of the second bridge arm within the second half period is less than an operating duty cycle of the first bridge arm within the first half period, not adjusting the control signal of the switching transistor of the second bridge arm by using the logic control circuit.

With reference to the first aspect, in a second possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit.

The adjusting the control signals of the switching transistors of the full-bridge topology circuit by using the logic control circuit, so that operating duty cycles of two bridge arms on a primary side match includes:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjusting the control signal of the switching transistor of the first bridge arm by using the logic control circuit and based on a center tap voltage sampled within the second half period of the first period by the feedforward circuit, so that the operating duty cycle of the first bridge arm within the first half period of the second period is the same as the operating duty cycle of the second bridge arm within the second half period of the first period.

With reference to the first aspect or the first or the second possible implementation manner of the first aspect, in a third possible implementation manner, the secondary side of the full-bridge topology circuit may further use a current-doubler rectifier circuit, and the feedforward circuit is configured to sample a voltage of an output end of the current-doubler rectifier circuit after rectification, charge the capacitor in the feedforward circuit by using the voltage of the output end of the current-doubler rectifier circuit after the rectification, and control, by using the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, where different slopes of the sawtooth wave correspond to different input voltages of the power source; the feedforward circuit uses the sawtooth wave as a feedforward control signal.

The power source management method includes: modulating, by using the sawtooth signal, a feedback control signal of the feedback circuit by using the logic control circuit, and performing matching, to obtain feedforward performance and additionally prevent biasing.

With reference to the third possible implementation manner of the first aspect, in a fifth possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit, so that operating duty cycles of two bridge arms on a primary side match includes:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjusting the control signal of the switching transistor of the first bridge arm by using the logic control circuit and based on the voltage that is of the output end of the current-doubler rectifier circuit after the rectification and that is sampled within the second half period of the first period by the feedforward circuit, so that the operating duty cycle of the first bridge arm within the first half period of the second period is the same as the operating duty cycle of the second bridge arm within the second half period of the first period.

With reference to the first aspect and the first to the fifth possible implementation manners of the first aspect, in a sixth possible implementation manner, the method further includes:

connecting, on the primary side of the full-bridge topology circuit transformer, a blocking capacitor to the transformer in series, to assist in correcting biasing.

A second aspect of the embodiments of the present application provides a power source, configured to suppress input disturbance of a power source and prevent a power source transformer biasing, where the power source includes a full-bridge topology circuit and a control circuit, where the control circuit includes a logic control circuit, a feedforward circuit, and a feedback circuit, a secondary side of the full-bridge topology circuit uses a full-wave rectifier circuit, and the feedforward circuit is configured to sample a center tap voltage of the full-wave rectifier circuit, charge a capacitor in the feedforward circuit by using the center tap voltage, and control, by using the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, where different slopes of the sawtooth wave correspond to different input voltages of the power source; the feedforward circuit uses the sawtooth wave as a feedforward control signal; the logic control circuit is configured to modulate, by using the sawtooth signal, a feedback control signal of the feedback circuit, and perform matching, to obtain feedforward performance and additionally prevent biasing.

The logic control circuit is specifically includes:

a comparator circuit, configured to compare the feedforward control signal with the feedback control signal, output the signals after the comparison, and perform matching, to obtain control signals of switching transistors of the full-bridge topology circuit; and a switching transistor control circuit, configured to adjust the control signals of the switching transistors of the full-bridge topology circuit, so that operating duty cycles of two bridge arms on a primary side match, are symmetric within one switch period of the logic control circuit, or match for a long time, to prevent the transformer biasing.

With reference to the second aspect, in a first possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit.

The switching transistor control circuit is specifically configured to:

adjust the control signals of the switching transistors of the two bridge arms within the one switch period of the logic control circuit and based on a center tap voltage sampled within the first half period by the feedforward circuit, so that an operating duty cycle of the second bridge arm within the second half period is the same as an operating duty cycle of the first bridge arm within the first half period; or if an operating duty cycle of the second bridge arm within the second half period is greater than an operating duty cycle of the first bridge arm within the first half period, adjust the control signals of the switching transistors of the two bridge arms by using the logic control circuit and based on a center tap voltage sampled within the first half period by the feedforward circuit, so that the operating duty cycle of the second bridge arm within the second half period is the same as the operating duty cycle of the first bridge arm within the first half period; or if an operating duty cycle of the second bridge arm within the second half period is less than an operating duty cycle of the first bridge arm within the first half period, not adjust, by the logic control circuit, the control signal of the switching transistor of the second bridge arm.

With reference to the second aspect, in a second possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit, and the switching transistor control circuit is specifically configured to:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjust, by the logic control circuit, the control signal of the switching transistor of the first bridge arm based on a center tap voltage sampled within the second half period of the first period by the feedforward circuit, so that the operating duty cycle of the first bridge arm within the first half period of the second period is the same as the operating duty cycle of the second bridge arm within the second half period of the first period.

With reference to the second aspect, in a third possible implementation manner, the secondary side of the full-bridge topology circuit may further use a current-doubler rectifier circuit, and the feedforward circuit is configured to sample a voltage of an output end of the current-doubler rectifier circuit after rectification, charge the capacitor in the feedforward circuit by using the voltage of the output end of the current-doubler rectifier circuit after the rectification, and control, by using the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, where different slopes of the sawtooth wave correspond to different input voltages of the power source; the feedforward circuit uses the sawtooth wave as a feedforward control signal; the logic control circuit is configured to modulate, by using the sawtooth signal, a feedback control signal of the feedback circuit, and perform matching, to obtain feedforward performance and additionally prevent biasing.

The logic control circuit specifically includes:

a comparator circuit, configured to compare the feedforward control signal with the feedback control signal, output the signals after the comparison, and perform matching, to obtain control signals of switching transistors of the full-bridge topology circuit; and a switching transistor control circuit, configured to adjust the control signals of the switching transistors of the full-bridge topology circuit, so that operating duty cycles of two bridge arms on a primary side match, are symmetric within one switch period of the logic control circuit, or match for a long time, to prevent the transformer biasing.

With reference to the third possible implementation manner of the second aspect, in a fourth possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit.

The switching transistor control circuit is specifically configured to:

adjust the control signals of the switching transistors of the two bridge arms within the one switch period of the logic control circuit and based on the voltage that is of the output end of the current-doubler rectifier circuit after the rectification and that is sampled within the first half period by the feedforward circuit, so that an operating duty cycle of the second bridge arm within the second half period is the same as an operating duty cycle of the first bridge arm within the first half period; or if an operating duty cycle of the second bridge arm within the second half period is greater than an operating duty cycle of the first bridge arm within the first half period, adjust the control signals of the switching transistors of the two bridge arms based on the voltage that is of the output end of the current-doubler rectifier circuit after the rectification and that is sampled within the first half period by the feedforward circuit, so that the operating duty cycle of the second bridge arm within the second half period is the same as the operating duty cycle of the first bridge arm within the first half period; or if an operating duty cycle of the second bridge arm within the second half period is less than an operating duty cycle of the first bridge arm within the first half period, not adjust the control signal of the switching transistor of the second bridge arm.

With reference to the third possible implementation manner of the second aspect, in a fifth possible implementation manner, the two bridge arms include a first bridge arm and a second bridge arm, where the first bridge arm is conducted within a first half period of the one switch period of the logic control circuit, and the second bridge arm is conducted within a second half period of the one switch period of the logic control circuit.

The switching transistor control circuit is specifically configured to:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjust the control signal of the switching transistor of the first bridge arm based on the voltage that is of the output end of the current-doubler rectifier circuit after the rectification and that is sampled within the second half period of the first period by the feedforward circuit, so that the operating duty cycle of the first bridge arm within the first half period of the second period is the same as the operating duty cycle of the second bridge arm within the second half period of the first period.

To implement the embodiments of the present application has the following beneficial effects:

Control signals of switching transistors of two bridge arms on a primary side of a full-bridge topology circuit are adjusted by using a logic control circuit, and based on a voltage that is output by a secondary side of the full-bridge topology circuit and that is sampled by a feedforward circuit, to ensure that operating duty cycles of the two bridge arms are symmetric within one switch period of the logic control circuit or match for a long time, thereby eliminating biasing generated in a transformer. Under a precondition of acquiring good feedforward performance and being capable of quickly responding to an input voltage change, input disturbance of a power source can be suppressed and transformer biasing of the power source can be prevented, which ensures that the power source works normally.

BRIEF DESCRIPTION OF DRAWINGS

To describe the technical solutions in some embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
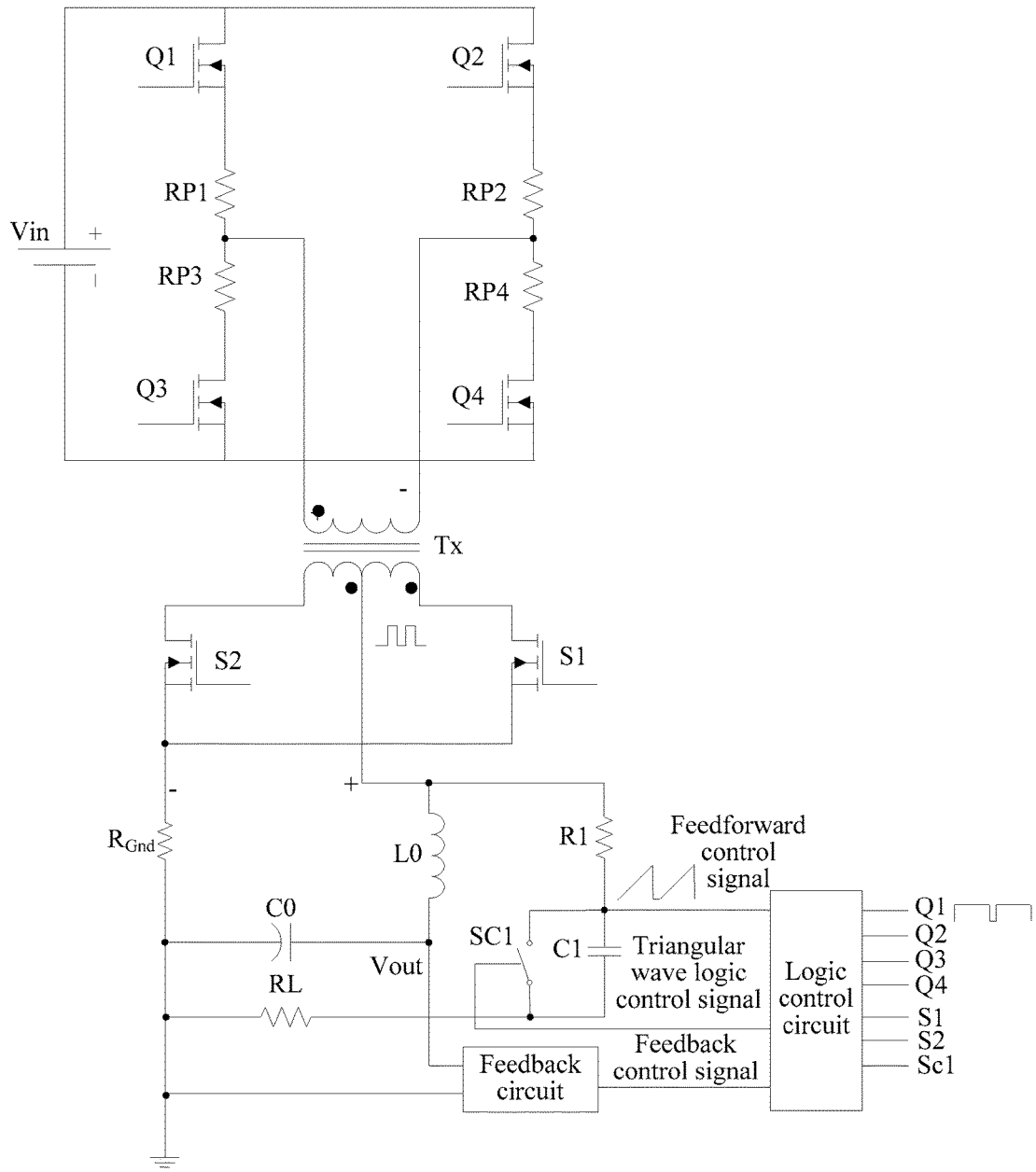
FIG. 1 is a schematic diagram of a circuit in an embodiment of a power source according to the present application.

FIG. 1 is a schematic diagram of a circuit in an embodiment of a power source according to the present application. As shown in FIG. 1, the power source includes a full-bridge topology circuit and a control circuit, where the control circuit includes a logic control circuit, a feedforward circuit, and a feedback circuit. Switching transistors Q1, Q2, Q3, and Q4, a primary side of a transformer Tx, and an input voltage Vin form the full-bridge topology circuit. A drain of Q1 is connected to a positive pole of Vin, a source is connected to a drain of Q4 by using the primary side of Tx, and a source of Q4 is connected to a negative pole of Vin and the ground, to form one diagonal bridge arm of a full bridge. A drain of Q2 is connected to the positive pole of Vin, a source is connected to a drain of Q3 by using the positive pole and the negative pole of the primary side of Tx, and a source of Q3 is connected to the negative pole of Vin and the ground, to form another diagonal bridge arm of the full bridge. A secondary side of Tx is connected to switching transistors S1 and S2, to form a full-wave rectifier circuit, and a center tap of the secondary side of Tx is grounded by using an inductor L0 and a resistor RL. In this way, a center tap voltage of a secondary-side winding may charge a capacitor C0, and then a switching transistor SC1 of the feedforward circuit is controlled, by using the logic control circuit, to periodically discharge, thereby generating a sawtooth wave that can represent an input voltage of the power source and that separately corresponds to the two bridge arms of the full-bridge topology circuit, where different slopes of the sawtooth wave correspond to different input voltages of the power source. In the prior art, two bridge arms of a full-bridge topology circuit are alternately conducted, and currents borne by the two bridge arms may be inconsistent, which causes asymmetric impedances for the alternate conduction of the two bridge arms, thereby causing asymmetric operating duty cycles of the two bridge arms, and thereby causing the transformer to generate biasing. In an existing pseudo peak value feedforward mode, although an input voltage change may be quickly reflected, biasing is easily generated, and the generated biasing cannot be corrected. In this embodiment of the present application, the feedforward circuit is configured to use the sawtooth wave as a feedforward control signal, and the logic control circuit is configured to modulate, by using the sawtooth signal, a feedback control signal of a feedback circuit, and perform matching, to obtain feedforward performance and additionally prevent biasing.

Figure 2:
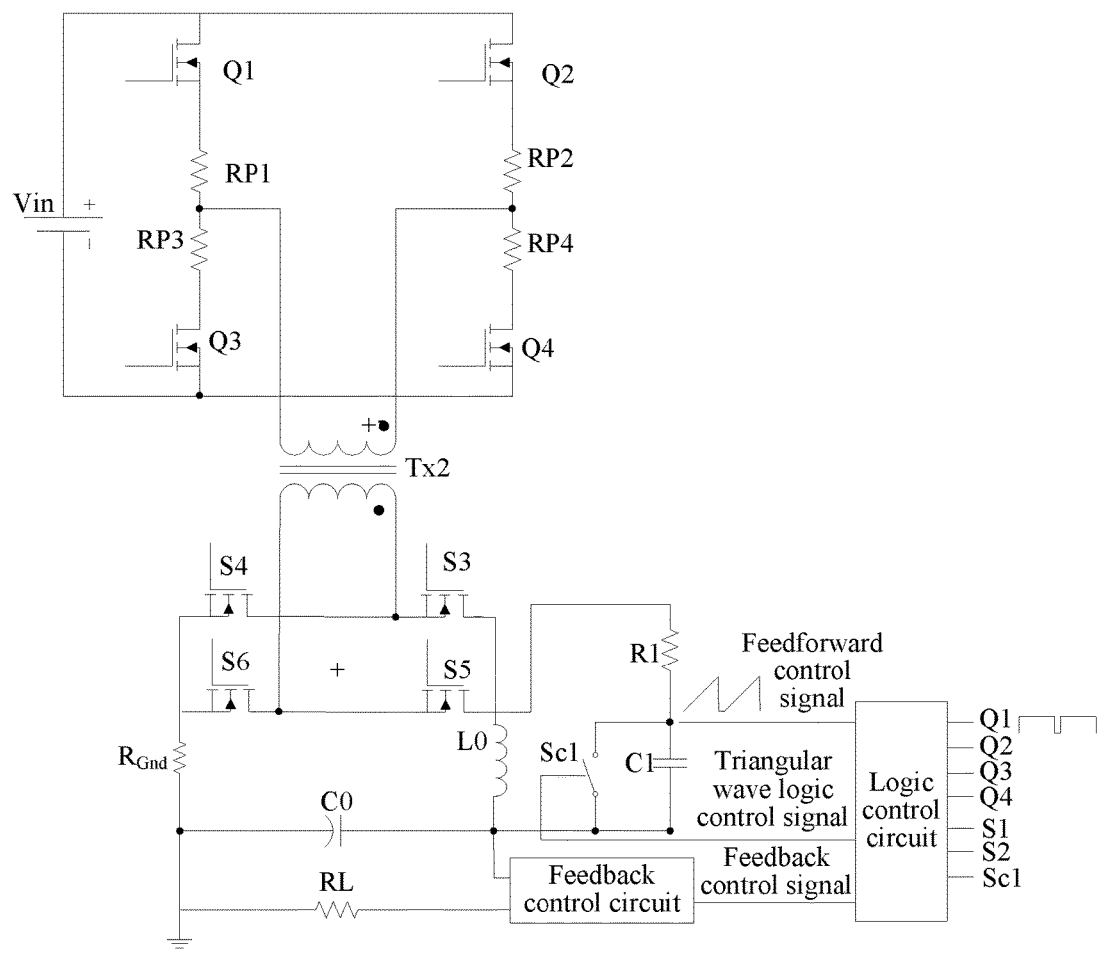
FIG. 2 is a schematic diagram of a circuit in another embodiment of a power source according to the present application.

In a feasible implementation manner, as shown in FIG. 2, in a full-bridge topology circuit, a secondary side of a transformer Tx may form, together with switching transistors S3, S4, S5, and S6, a current-doubler rectifier circuit, where an output end of the current-doubler rectifier circuit is grounded by using a resistor RGND, and another output end charges a capacitor C0 by using an inductor L0, and controls, by using a logic control circuit, a switching transistor SC1 of a feedforward circuit to periodically discharge, thereby generating a sawtooth wave that can represent an input voltage of a power source and that separately corresponds to two bridge arms of the full-bridge topology circuit, where different slopes of the sawtooth wave correspond to different input voltages of the power source. The feedforward circuit is configured to use the sawtooth wave as a feedforward control signal, and the logic control circuit is configured to modulate, by using the sawtooth signal, a feedback control signal of a feedback circuit, and perform matching, to obtain feedforward performance and additionally prevent biasing.

In this embodiment of the present application, the logic control circuit specifically includes: a comparator circuit, configured to compare the feedforward control signal with the feedback control signal, output the signals after the comparison, and perform matching, to obtain control signals of switching transistors of the full-bridge topology circuit; and a switching transistor control circuit, configured to adjust the control signals of the switching transistors of the full-bridge topology circuit, so that operating duty cycles of two bridge arms on a primary side match, are symmetric within one switch period of the logic control circuit, or match for a long time, to prevent the transformer biasing.

In some feasible implementation manners, the switching transistor control circuit may be specifically configured to:

adjust the control signals of the switching transistors of the two bridge arms within the one switch period of the logic control circuit and based on a center tap voltage sampled within the first half period by the feedforward circuit, so that an operating duty cycle of the second bridge arm within the second half period is the same as an operating duty cycle of the first bridge arm within the first half period; or if an operating duty cycle of the second bridge arm within the second half period is greater than an operating duty cycle of the first bridge arm within the first half period, adjust the control signals of the switching transistors of the two bridge arms by using the logic control circuit and based on a center tap voltage sampled within the first half period by the feedforward circuit, so that the operating duty cycle of the second bridge arm within the second half period is the same as the operating duty cycle of the first bridge arm within the first half period; or if an operating duty cycle of the second bridge arm within the second half period is less than an operating duty cycle of the first bridge arm within the first half period, not adjust, by the logic control circuit, the control signal of the switching transistor of the second bridge arm.

In some feasible implementation manners, the switching transistor control circuit is specifically configured to:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjust, by the logic control circuit, the control signal of the switching transistor of the first bridge arm based on a center tap voltage sampled within the second half period of the first period by the feedforward circuit, so that the operating duty cycle of the first bridge arm within the first half period of the second period is the same as the operating duty cycle of the second bridge arm within the second half period of the first period.

Figure 3:
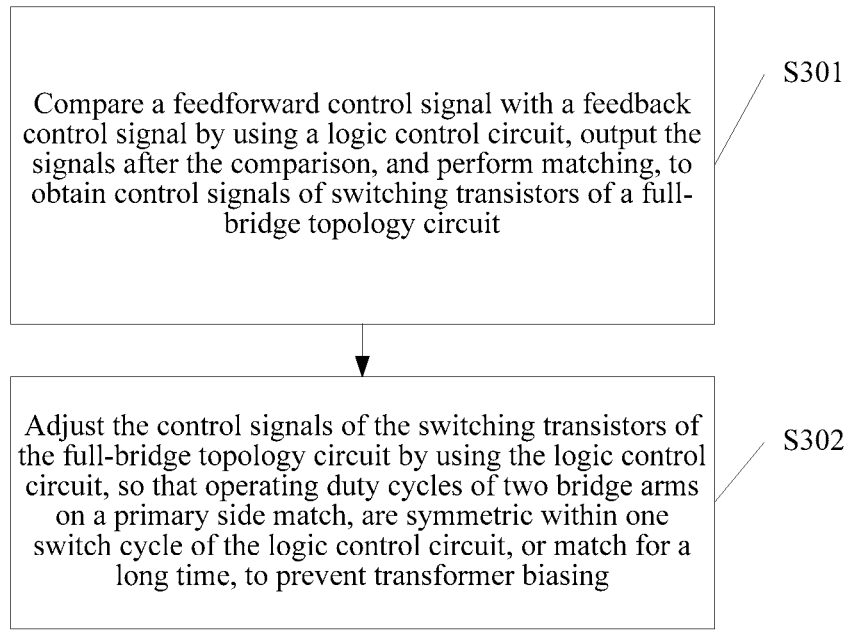
FIG. 3 is a schematic flowchart of an embodiment of a power source management method according to the present application.

Refer to FIG. 3, which is a schematic flowchart of an embodiment of a power source management method according to the present application. The method is used to suppress input disturbance of a power source and eliminate biasing in the power source. Reference may also be made to FIG. 1 or FIG. 2. The power source includes a full-bridge topology circuit and a control circuit, where the control circuit includes a logic control circuit, a feedforward circuit, and a feedback circuit, a secondary side of the full-bridge topology circuit uses a full-wave rectifier circuit or a current-doubler rectifier circuit, and the feedforward circuit is configured to sample a center tap voltage of the full-wave rectifier circuit or a voltage of an output end of the current-doubler rectifier circuit, charge a capacitor n the feedforward circuit by using the center tap voltage or the voltage of the output end of the current-doubler rectifier circuit, and control, by using the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, where different slopes of the sawtooth wave correspond to different input voltages of the power source; and the feedforward circuit uses the sawtooth wave as a feedforward control signal.

In this embodiment, the power source management method is modulating, by using the sawtooth signal, a feedback control signal of the feedback circuit by using the logic control circuit, and performing matching, to obtain feedforward performance and additionally prevent biasing; and the following steps may be specifically included:

S301: A logic control circuit compares a feedforward control signal with a feedback control signal, output the signals after the comparison, and performs matching, to obtain control signals of switching transistors of a full-bridge topology circuit.

S302: The logic control circuit adjusts the control signals of the switching transistors of the full-bridge topology circuit, so that operating duty cycles of two bridge arms on a primary side match, are symmetric within one switch period of the logic control circuit, or match for a long time, to prevent transformer biasing.

In this embodiment of the present application, the two bridge arms include a first bridge arm and a second bridge arm, where the first bridge arm is conducted within a first half period of the one switch period of the logic control circuit, and the second bridge arm is conducted within a second half period of the one switch period of the logic control circuit. It should be noted that, in this embodiment of the present application, the first half period and the second half period are relatively allocated. For example, if 1 ms to 10 ms is allocated as one period, 5 ms to 10 ms is a second half period of the period; if 5 ms to 15 ms is allocated as one period, 5 ms to 10 ms is a first half period of the period.

In a feasible implementation manner, the adjusting, by the logic control circuit, the control signals of the switching transistors of the full-bridge topology circuit, so that operating duty cycles of two bridge arms on a primary side match, are symmetric within one switch period of the logic control circuit, or match for a long time may include:

adjusting a control signal of a switching transistor of the second bridge arm within the one switch period of the logic control circuit, by using the logic control circuit, and based on a center tap voltage sampled within a first half period by the feedforward circuit or a voltage that is of an output end of the current-doubler rectifier circuit after rectification and that is sampled within the first half period by the feedforward circuit, so that an operating duty cycle of the second bridge arm within the second half period is the same as an operating duty cycle of the first bridge arm within the first half period; or if an operating duty cycle of the second bridge arm within the second half period is greater than an operating duty cycle of the first bridge arm within the first half period, adjusting a control signal of a switching transistor of the second bridge arm by using the logic control circuit and based on the voltage that is of the output end of the current-doubler rectifier circuit after the rectification and that is sampled within the first half period by the feedforward circuit, so that the operating duty cycle of the second bridge arm within the second half period is the same as the operating duty cycle of the first bridge arm within the first half period; or if an operating duty cycle of the second bridge arm within the second half period is less than an operating duty cycle of the first bridge arm within the first half period, not adjusting the control signals of the switching transistors of the full-bridge topology circuit.

In a feasible implementation manner, the adjusting, by the logic control circuit, the control signals of the switching transistors of the full-bridge topology circuit, so that operating duty cycles of two bridge arms on a primary side match, are symmetric within one switch period of the logic control circuit, or match for a long time may include:

within two adjacent switch periods of the logic control circuit, where the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjusting the control signal of the switching transistor of the first bridge arm by using the logic control circuit and based on the voltage that is of the output end of the current-doubler rectifier circuit after the rectification and that is sampled within the first half period by the feedforward circuit, so that the operating duty cycle of the first bridge arm within the first half period of the second period is the same as the operating duty cycle of the second bridge arm within the second half period of the first period.

Refer to FIG. 4 to FIG. 7, which are matching logic diagrams of an embodiment of a power source management method according to the present application. A fault signal is a center tap voltage that is of a full-wave rectifier circuit and that is sampled by a feedforward circuit or a voltage that is of an output end of a current-doubler rectifier circuit and that is sampled by a feedforward circuit. A high level of the fault signal indicates an overcurrent signal or another fault signal that is detected by the feedforward circuit. 0A indicates an operating duty cycle of a first bridge arm in the full-bridge topology circuit; and 1A indicates an operating duty cycle of a second bridge arm in the full-bridge topology circuit. In the figures, a solid line indicates operating duty cycles of the first bridge arm and the second bridge arm when the feedforward circuit does not detect an overcurrent signal or another fault signal, and a dashed line indicates operating duty cycles of two bridge arms when the feedforward circuit detects an overcurrent signal or another fault signal, and the logic control circuit adjusts control signals of switching transistors of the full-bridge topology circuit, so that the operating duty cycles of the two bridge arms on a primary side match. Within one switch period of the logic control circuit, the first bridge arm is conducted within a first half period, and the second bridge arm is conducted within a second half period.

Figure 4:
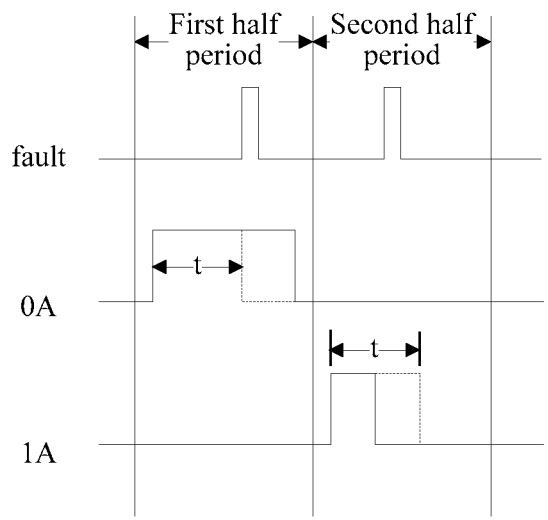
FIG. 4 is a matching logic diagram of a power source management method according to the present application.

In a feasible implementation manner, as shown in FIG. 4, when the first bridge arm is conducted within the first half period, if the feedforward circuit detects a fault signal, when the fault signal changes to a high level, the logic control circuit controls the first bridge arm to stop being conducted, so that an operating duty cycle of the first bridge arm within the first half period decreases, and the logic control circuit adjusts a control signal of a switching transistor of the second bridge arm, so that an operating duty cycle of the second bridge arm within the second half period is the same as the operating duty cycle of the first bridge arm within the first half period.

Figure 5:
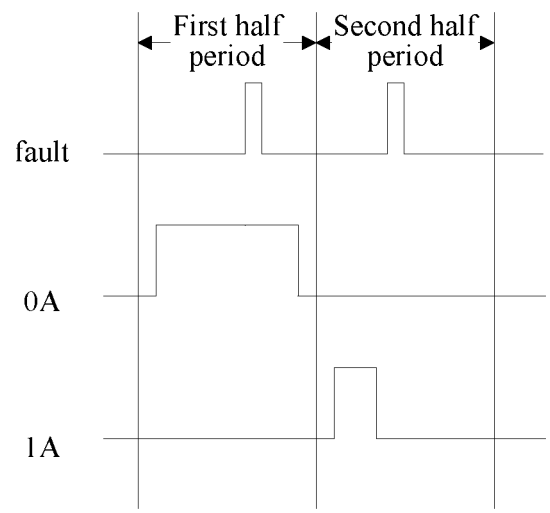
FIG. 5 is another matching logic diagram of a power source management method according to the present application.

In a feasible implementation manner, as shown in FIG. 5, when the first bridge arm is conducted within the first half period, if the feedforward circuit detects a fault signal, when the fault signal changes to a high level, the logic control circuit controls the first bridge arm to stop being conducted; when the second bridge arm is conducted within the second half period, if an operating duty cycle of the second bridge arm within the second half period is less than an operating duty cycle of the first bridge arm within the first half period, the logic control circuit does not adjust a control signal of a switching transistor of the second bridge arm.

Figure 6:
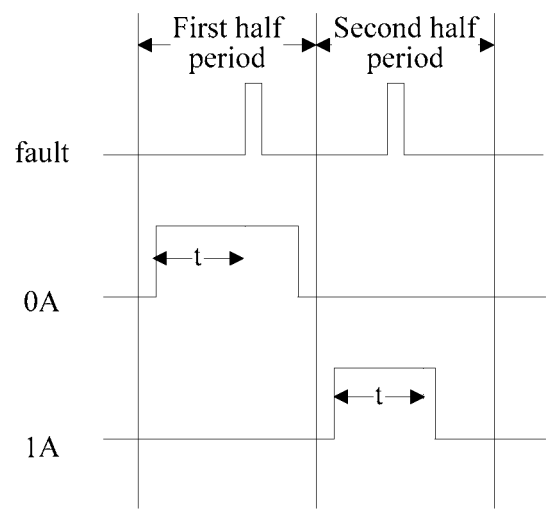
FIG. 6 is still another matching logic diagram of a power source management method according to the present application.

In a feasible implementation manner, as shown in FIG. 6, when the first bridge arm is conducted within the first half period, if the feedforward circuit detects a fault signal, when the fault signal changes to a high level, the logic control circuit controls the first bridge arm to stop being conducted; when the second bridge arm is conducted within the second half period, if an operating duty cycle of the second bridge arm within the second half period is greater than an operating duty cycle of the first bridge arm within the first half period, the logic control circuit adjusts a control signal of a switching transistor of the second bridge arm, so that the operating duty cycle of the second bridge arm within the second half period is greater than the operating duty cycle of the first bridge arm within the first half period.

Figure 7:
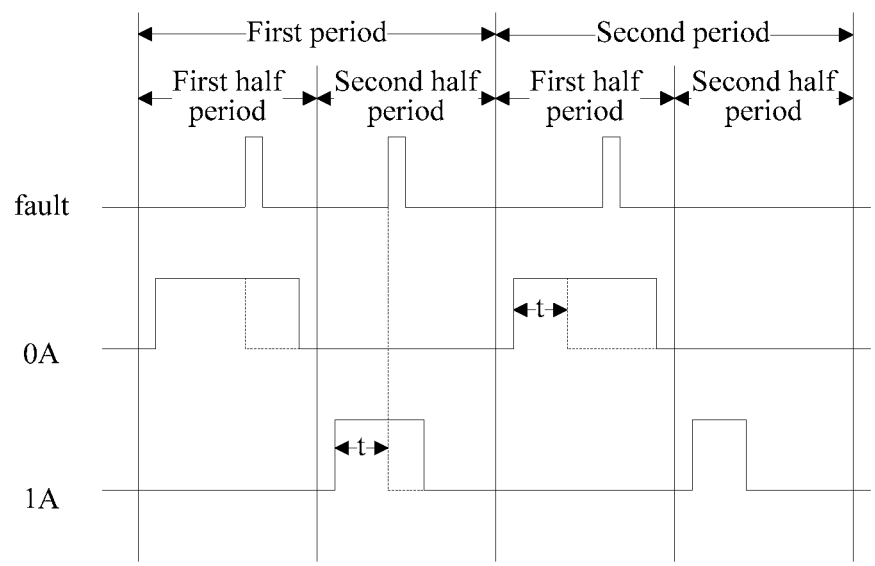
FIG. 7 is still another matching logic diagram of a power source management method according to the present application.

In a feasible implementation manner, as shown in FIG. 7, when the second bridge arm is conducted within a second half period of a first period, if the feedforward circuit detects a fault signal, when the fault signal changes to a high level, the logic control circuit controls the second bridge arm to stop being conducted; and subsequently, when the first bridge arm is conducted within a first half period of a second period, the logic control circuit adjusts a control signal of a switching transistor of the first bridge arm, so that an operating duty cycle of the first bridge arm within the first half period of the second period is the same as an operating duty cycle of the second bridge arm within the second half period of the first period.

In this embodiment of the present application, a generated biasing may be further corrected by connecting a blocking capacitor to the primary side of the full-bridge topology circuit in series.

Control signals of switching transistors of two bridge arms on a primary side of a full-bridge topology circuit are adjusted by using a logic control circuit, and based on a voltage that is output by a secondary side of the full-bridge topology circuit and that is sampled by a feedforward circuit, to ensure that operating duty cycles of the two bridge arms are symmetric within one switch period of the logic control circuit or match for a long time, thereby eliminating biasing generated in a transformer. Under a precondition of acquiring good feedforward performance and being capable of quickly responding to an input voltage change, input disturbance of a power source can be suppressed and transformer biasing of the power source can be prevented, which ensures that the power source works normally.

It should be noted that the embodiments in this specification are all described in a progressive manner, each embodiment focuses on a difference from other embodiments, and for same or similar parts in the embodiments, reference may be made to these embodiments.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM for short), or a random access memory (Random Access Memory, RAM for short).

What is disclosed above is merely some embodiments of the present application, and certainly is not intended to limit the protection scope of the present application. Therefore, equivalent variations made in accordance with the claims of the present application shall fall within the scope of the present application.

What is claimed is:

1. A power source management method, used to suppress input disturbance of a power source and prevent a power source transformer biasing, wherein the power source comprises a full-bridge topology circuit and a control circuit; the control circuit comprises a logic control circuit, a feedforward circuit, and a feedback circuit, a secondary side of the full-bridge topology circuit includes a full-wave rectifier circuit, the power source management method comprising:
sampling, by the feedforward circuit, a center tap voltage of the full-wave rectifier circuit;

charging a capacitor in the feedforward circuit by using the center tap voltage;

controlling, by the logic control circuit, a feedforward circuit switching transistor to periodically discharge the capacitor in the feedforward circuit, to generate a sawtooth wave that represents an input voltage of the power source and that separately corresponds to two bridge arms of the full-bridge topology circuit, wherein different slopes of the sawtooth wave correspond to different input voltages of the power source and the feedforward circuit uses the sawtooth wave as a feedforward control signal;

modulating, by using the sawtooth wave, a feedback control signal of the feedback circuit by using the logic control circuit; and performing matching, to obtain feedforward performance and additionally prevent biasing by:

comparing the feedforward control signal with the feedback control signal by using the logic control circuit;

outputting the signals after the comparison;

performing matching, to obtain control signals of switching transistors of the full-bridge topology circuit; and adjusting the control signals of the switching transistors of the full-bridge topology circuit by using the logic control circuit to match operating duty cycles of two bridge arms on a primary side, to prevent the transformer biasing, wherein matching operating duty cycles of two bridge arms on a primary side comprises:

configuring the operating duty cycles of two bridge arms on the primary side to be symmetric within one switch period of the logic control circuit, or matching the operating duty cycles of two bridge arms on the primary side for a long time.

2. The method according to claim 1, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit to match operating duty cycles of two bridge arms on the primary side comprises:

adjusting the control signals of the switching transistors of the two bridge arms within the one switch period of the logic control circuit, by using the logic control circuit, and based on a center tap voltage sampled within the first half period by the feedforward circuit, to configure an operating duty cycle of the second bridge arm within the second half period to be the same as an operating duty cycle of the first bridge arm within the first half period; or if an operating duty cycle of the second bridge arm within the second half period is greater than an operating duty cycle of the first bridge arm within the first half period, adjusting the control signals of the switching transistors of the two bridge arms by using the logic control circuit and based on a center tap voltage sampled within the first half period by the feedforward circuit to configure the operating duty cycle of the second bridge arm within the second half period to be the same as the operating duty cycle of the first bridge arm within the first half period; or if an operating duty cycle of the second bridge arm within the second half period is less than an operating duty cycle of the first bridge arm within the first half period, skipping adjusting the control signal of a switching transistor of the second bridge arm by using the logic control circuit.

3. The method according to claim 1, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit to match operating duty cycles of two bridge arms on a primary side comprises:

within two adjacent switch periods of the logic control circuit, wherein the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjusting the control signal of a switching transistor of the first bridge arm by using the logic control circuit and based on a center tap voltage sampled within the second half period of the first period by the feedforward circuit to configure the operating duty cycle of the first bridge arm within the first half period of the second period to be the same as the operating duty cycle of the second bridge arm within the second half period of the first period.

4. The method according to claim 1, wherein the secondary side of the full-bridge topology circuit may further use a current-doubler rectifier circuit, and the feedforward circuit is configured to sample a voltage of an output end of the current-doubler rectifier circuit after rectification, charge the capacitor in the feedforward circuit by using the voltage of the output end of the current-doubler rectifier circuit after the rectification.

5. The method according to claim 4, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit to match operating duty cycles of two bridge arms on a primary side comprises:

adjusting the control signals of the switching transistors of the two bridge arms within the one switch period of the logic control circuit, by using the logic control circuit, and based on the voltage that is of the output end of the current-doubler rectifier circuit after the rectification and that is sampled within the first half period by the feedforward circuit to configure an operating duty cycle of the second bridge arm within the second half period to be the same as an operating duty cycle of the first bridge arm within the first half period; or if an operating duty cycle of the second bridge arm within the second half period is greater than an operating duty cycle of the first bridge arm within the first half period, adjusting the control signals of the switching transistors of the two bridge arms by using the logic control circuit and based on the voltage that is of the output end of the current-doubler rectifier circuit after the rectification and that is sampled within the first half period by the feedforward circuit to configure the operating duty cycle of the second bridge arm within the second half period to be the same as the operating duty cycle of the first bridge arm within the first half period; or if an operating duty cycle of the second bridge arm within the second half period is less than an operating duty cycle of the first bridge arm within the first half period, skipping adjusting the control signal of a switching transistor of the second bridge arm by using the logic control circuit.

6. The method according to claim 4, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the adjusting the control signals of the switching transistors of the full-bridge topology circuit by using the logic control circuit to match duty cycles of two bridge arms on a primary side comprises:

within two adjacent switch periods of the logic control circuit, wherein the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjusting the control signal of a switching transistor of the first bridge arm by using the logic control circuit and based on the voltage that is of the output end of the current-doubler rectifier circuit after the rectification and that is sampled within the second half period of the first period by the feedforward circuit to configure the operating duty cycle of the first bridge arm within the first half period of the second period to be the same as the operating duty cycle of the second bridge arm within the second half period of the first period.

7. The method according to claim 1, wherein the method further comprises:

connecting, on a primary side of a full-bridge topology circuit transformer, a blocking capacitor to the transformer in series, to assist in correcting biasing.

8. A power source, configured to suppress input disturbance of a power source and prevent a power source transformer biasing, wherein the power source comprises:
a full-bridge topology circuit; and
a control circuit, comprising a logic control circuit, a feedforward circuit, and a feedback circuit,
wherein a secondary side of the full-bridge topology circuit comprises a full-wave rectifier circuit;
wherein the feedforward circuit is configured to:
sample a center tap voltage of the full-wave rectifier circuit; and
charge a capacitor in the feedforward circuit by using the center tap voltage;
wherein the logic control circuit is configured to control a feedforward circuit switching transistor to periodically discharge the capacitor in the feedforward circuit, to generate a sawtooth wave that represents an input voltage of the power source and that separately corresponds to two bridge arms of the full-bridge topology circuit, wherein different slopes of the sawtooth wave correspond to different input voltages of the power source;

wherein the feedforward circuit uses the sawtooth wave as a feedforward control signal;
wherein the logic control circuit is configured to:
modulate, by using the sawtooth wave, a feedback control signal of the feedback circuit, and
perform matching, to obtain feedforward performance and additionally prevent biasing; and
wherein the logic control circuit comprises:
a comparator circuit, configured to:
compare the feedforward control signal with the feedback control signal;
output the signals after the comparison; and
perform matching, to obtain control signals of switching transistors of the full-bridge topology circuit; and
a switching transistor control circuit, configured to:
adjust the control signals of the switching transistors of the full-bridge topology circuit to match operating duty cycles of two bridge arms on a primary side by:
configuring the operating duty cycles of two bridge arms on the primary to be symmetric within one switch period of the logic control circuit, or
matching the operating duty cycles of two bridge arms on the primary side for a long time, to prevent the transformer biasing.

9. The power source according to claim 8, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the switching transistor control circuit is configured to:

adjust the control signals of the switching transistors of the two bridge arms within the one switch period of the logic control circuit based on a center tap voltage sampled within the first half period by the feedforward circuit to configure an operating duty cycle of the second bridge arm within the second half period to be the same as an operating duty cycle of the first bridge arm within the first half period; or if an operating duty cycle of the second bridge arm within the second half period is greater than an operating duty cycle of the first bridge arm within the first half period, adjust the control signals of the switching transistors of the two bridge arms by using the logic control circuit and based on a center tap voltage sampled within the first half period by the feedforward circuit to configure the operating duty cycle of the second bridge arm within the second half period to be the same as the operating duty cycle of the first bridge arm within the first half period; or if an operating duty cycle of the second bridge arm within the second half period is less than an operating duty cycle of the first bridge arm within the first half period, skip adjusting the control signal of the switching transistor of the second bridge arm.

10. The power source according to claim 8, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the switching transistor control circuit is configured to:

within two adjacent switch periods of the logic control circuit, wherein the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjust, by the logic control circuit, the control signal of the switching transistor of the first bridge arm based on a center tap voltage sampled within the second half period of the first period by the feedforward circuit to configure the operating duty cycle of the first bridge arm within the first half period of the second period to be the same as the operating duty cycle of the second bridge arm within the second half period of the first period.

11. The power source according to claim 10, wherein the secondary side of the full-bridge topology circuit further includes a current-doubler rectifier circuit, and the feedforward circuit is configured to:
sample a voltage of an output end of the current-doubler rectifier circuit after rectification; and
charge the capacitor in the feedforward circuit by using the voltage of the output end of the current-doubler rectifier circuit after the rectification.

12. The power source according to claim 11, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the switching transistor control circuit is configured to:
adjust the control signals of the switching transistors of the two bridge arms within the one switch period of the logic control circuit and based on the voltage that is of the output end of the current-doubler rectifier circuit after the rectification and that is sampled within the first half period by the feedforward circuit to configure an operating duty cycle of the second bridge arm within the second half period to be the same as an operating duty cycle of the first bridge arm within the first half period; or
if an operating duty cycle of the second bridge arm within the second half period is greater than an operating duty cycle of the first bridge arm within the first half period, adjust the control signals of the switching transistors of the two bridge arms based on the voltage that is of the output end of the current-doubler rectifier circuit after the rectification and that is sampled within the first half period by the feedforward circuit to configure the operating duty cycle of the second bridge arm within the second half period to be the same as the operating duty cycle of the first bridge arm within the first half period; or
if an operating duty cycle of the second bridge arm within the second half period is less than an operating duty cycle of the first bridge arm within the first half period, skip adjusting the control signal of the switching transistor of the second bridge arm.

13. The power source according to claim 11, wherein the two bridge arms comprise a first bridge arm and a second bridge arm, wherein the first bridge arm is conducted within a first half period of the one switch period of the logic control circuit, and the second bridge arm is conducted within a second half period of the one switch period of the logic control circuit, and the switching transistor control circuit is specifically configured to:
within two adjacent switch periods of the logic control circuit, wherein the two adjacent switch periods of the logic control circuit are respectively a first period and a second period in a time sequence, if an operating duty cycle of the first bridge arm within a first half period of the second period is less than an operating duty cycle of the second bridge arm within a second half period of the first period, adjust the control signal of the switching transistor of the first bridge arm based on the voltage that is of the output end of the current-doubler rectifier circuit after the rectification and that is sampled within the second half period of the first period by the feedforward circuit to configure the operating duty cycle of the first bridge arm within the first half period of the second period to be the same as the operating duty cycle of the second bridge arm within the second half period of the first period.

14. The power source according to claim 8, wherein the power source further comprises:
a blocking capacitor, wherein the blocking capacitor is connected, on a primary side of a full-bridge topology circuit transformer, to the transformer in series, to assist in correcting biasing.

* * * * *